Figure 1:
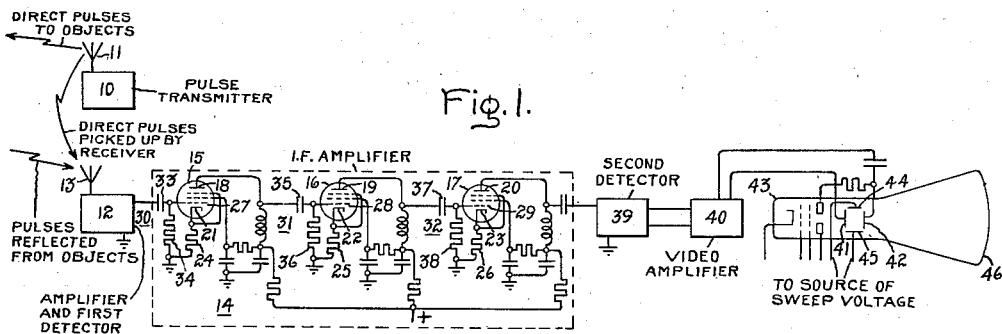

Feb. 17, 1948.  G. W. FYLER  2,435,960
RADIO DETECTING AND RANGE FINDING SYSTEMS
Filed Sept. 2, 1942

Inventor:
George W. Fyler,
by Harry E. Dunham
His Attorney.

Patented Feb. 17, 1948

2,435,960

UNITED STATES PATENT OFFICE 2,435,960

RADIO DETECTING AND RANGE FINDING SYSTEM

George W. Fyler, Stratford, Conn., assignor to General Electric Company, a corporation of New York Application September 2, 1942, Serial No. 457,064

9 Claims. (Cl. 250—1.66)

My invention relates to systems employing radio pulses for the detecting and range finding of distant objects or targets, and particularly to gain control and band width control means for the receiving apparatus upon which the pulses reflected from distant objects are impressed.

In common practice the receivers of the reflected pulses are characterized by fixed gain and fixed band width during the reception periods of the pulses, that is, in the periods between the main pulses projected directly from the transmitter to the objects or targets. In the use of these receivers the difficulty has been encountered, however, that for amplifying and indicating the more distant reflected pulses or echoes which are relatively weak upon arriving at the receiver, the required receiver gain is very high. The relatively strong reflected pulses from nearby objects then tend, because of the high gain, to saturate the receiver, and in many cases it is impossible, in the oscillograph or like pulse indicating means of the receiving apparatus, to distinguish between or to separate the closely spaced indications corresponding to nearby objects at slightly different distances from the receiver.

It has been found that an improved result is obtainable from the detecting and range finding system above mentioned by increasing the overall gain of the receiver with time during each reception period of the reflected pulses. Systems for providing such increasing gain of the receiver are described and claimed in co-pending application, Serial No. 449,390, of Franklin G. Patterson, filed July 2, 1942, and assigned to the assignee of my present application. Since the amplitude of the received pulses reflected from the objects in a given range varies inversely as much as the fourth power of the distance of the objects from the receiver, both a rapid variation of gain directly with distance and a wide variation of band width inversely with distance are desirable.

It is, therefore, an object of my present invention to provide an improved means in a detecting and range finding system, for increasing the gain of the receiver exponentially or as a power of time during each reception period.

A further object of the invention is to provide, in a system of the above-mentioned character, an improved means for increasing the gain of the intermediate frequency amplifiers of the receiver during each reception period.

Another object of the invention is to provide means for varying the band width of the receiver inversely with time during each reception period.

It is a further and particular object of the invention to increase, during each reception period in a pulse receiving system, the overall gain of the receiver and simultaneously to vary inversely with time the band width of the receiver.

In accordance with my present invention, the hereinabove mentioned difficulties are overcome and the foregoing objects are attained, firstly, by utilizing potentials from a suitable source and particularly the main pulses from the transmitter for producing suitably varying bias potentials on the receiver intermediate frequency amplifier stages to cause the desired gain increase during each reception period and at the same time to cause inverse varying of the band width by change of input capacity; and, secondly, by utilizing simultaneously, in the intermediate frequency amplifier stages, symmetrical detuning produced by unbypassed cathode resistances associated with the amplifier stages, to cause added inverse varying of the band width by change of amplifier input capacity.

Figure 5:
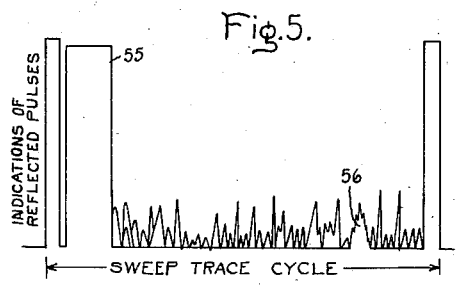
Figure 3:
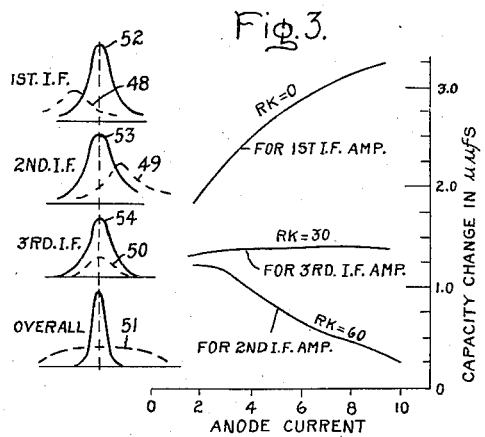
Figure 6:
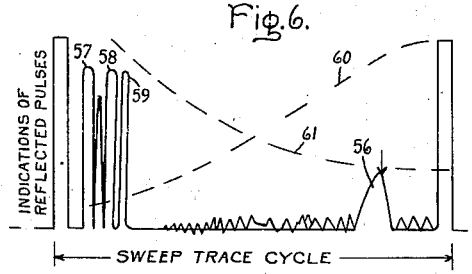
Figure 4:
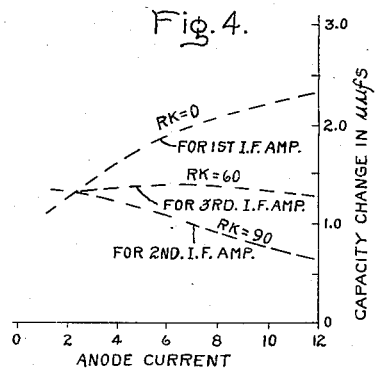
Figure 2:
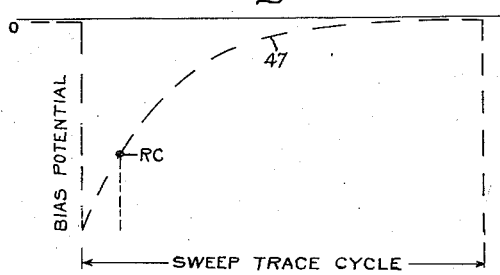

The novel features which are considered to be characteristic of my invention are set forth with particularity in the appended claims. My invention itself, however, both as to its organization and method of operation together with further objects and advantages thereof may best be understood by reference to the following description taken in connection with the accompanying drawing wherein Fig. 1 is a diagrammatic representation of a detecting and range finding system wherein my invention has been embodied; Fig. 2 shows an amplifier grid bias curve illustrating the invention in varying the receiver gain and band width; Figs. 3 and 4 show curves illustrating the invention in increasing the band width variation, and Figs. 5 and 6 show comparative results in indication of the reflected pulses in a detection and range finding system in accordance with my invention and a like system as employed heretofore.

In Fig. 1, in the detection and range finding system illustrated therein, the numeral 10 designates a pulse transmitter of any suitable form adapted to project radio pulses directly to objects or targets (not shown) from an antenna 11, and numeral 12 designates in the receiver portion of the system an amplifier and first detector stage provided with an antenna 13 upon which pulses reflected from or emanating from the objects or targets are impressed. The first stage 12 is connected to an intermediate frequency amplifier apparatus, designated generally by the numeral 14, which may comprise several stages 15, 16 and 17, including anodes 18, 19 and 20, cathodes 21, 22 and 23, unbypassed cathode resistors 24, 25 and 26, control electrodes 27, 28 and 29, and bias input or discharge circuits 30, 31 and 32, the latter circuits including respectively capacitance 33 and resistance 34, capacitance 35 and resistance 36, and capacitance 37 and resistance 38. A suitable source (not shown) of anode potential is provided to supply the several anode circuits.

The intermediate frequency amplifier apparatus 14 is connected to a second detector 39 connected in turn to a video amplifier 40 which impresses, in the usual manner, the voltages corresponding to the reflected pulses or echoes upon the vertical deflecting plates 41 and 42 of a conventional oscillographic device 43, the horizontal deflecting plates 44 and 45 of which are connected to a suitable source (not shown) of sweep trace voltage. The oscillographic device 43 is adapted to have formed upon its screen 46 a sweep trace having therein deflections or like indications corresponding to the reflected pulses or echoes received from the objects or targets during each reception period. As the structure and operation of the oscillographic device 43 form no part of the present invention the latter device will not be further described herein.

In arriving at an understanding of the manner in which the main pulses from the transmitter 10 are utilized in accordance with my present invention for biasing the control electrodes 27, 28 and 29 of the intermediate frequency amplifier devices 15, 16 and 17, it will be understood that in operation of the system illustrated in Fig. 1, not only at each pulse period is a high-intensity short-period pulse projected directly from the transmitter 10 to the remote objects, to be received and indicated by the receiving apparatus later in the reception period after traveling out to the objects and being reflected therefrom back to the receiver, but a portion of this high intensity and short-period pulse projected from the transmitter 10 is picked up at the exact instant of its initiation directly by the receiving apparatus unless the receiver is otherwise deenergized during the period of the transmitter pulse.

The transmitter pulse thus picked up by the receiver overloads every stage. The high negative bias which consequently appears on the intermediate frequency amplifier control electrodes 27, 28 and 29 because of rectification of the main pulse builds up during this main pulse. At the end of the main pulse period, however, the bias circuits 30 to 32 begin to discharge and the receiver begins to recover sensitivity, a suitable time constant being chosen for the bias discharge circuits so that maximum sensitivity is regained during the later portion of the reception period.

As the time constant of the capacitance-resistance discharge circuits 30 to 32 depends upon several factors, suitable values of the constants must be chosen for particular applications of the invention. One factor which must be considered is the repetition rate of the main pulse from transmitter 10. For example, a pulse repetition rate of 2000 per second requires a much faster time constant than a rate of 1000 per second. Another factor to be considered is the required rate of change for the bias voltage on the control electrodes of amplifiers 15 to 17, which is dependent upon the gain characteristic desired for the receiver and also upon the type of intermediate frequency amplifier employed. For example, an amplifier of the remote cutoff type would require a greater overall change in bias than other types. A third factor to be considered is the value of the negative bias potential produced by the main pulse on the control electrodes 27 to 29. The maximum negative bias thus produced should not exceed the cutoff bias of the amplifiers 15 to 17 as, otherwise, reflected pulses from nearby objects would fail to be recorded and would be lost since the sensitivity of the receiver would not be regained until after the arrival of these nearby echoes.

In calculating the suitable time constant of the bias discharge circuits 30 to 32 for a given case, it is to be noted that, for amplifier 16 for example, the potential to which capacitance 35 is charged during the period of the pulse from transmitter 10 depends upon the value of previous amplifier anode current, the value of capacitance 35, and the duration of the pulse. The surge current in a given amplifier has a definite value, and the duration of the surge current is a function of the width, or time period, of the main pulse. The charge-up potential produced on the capacitance 35 by the pulse from transmitter 10 can, therefore, be determined by varying the value of this capacitance. For example, by employing a larger capacitance value a smaller charge-up potential may be obtained. The discharge time constant being RC, where R is the resistance 36 and C is the capacitance 35, a suitable value of R is chosen for the particular value of C as determined by the charge-up condition above explained. Thus, in calculating the constants of the amplifier circuits for obtaining a desired receiver gain characteristic, any required time constant, RC, for the bias discharge circuit 31 may be obtained by employing different values of the capacitance 35.

As the echoes or reflected pulses from the most remote objects in a given range arrive toward the later portion of the reception period, the full gain of the receiver is needed along toward this later portion, in order that these echoes, which are relatively weak because of the distance of the objects from the receiver, may be clearly indicated in the sweep trace. The bias circuits 30 to 32 should therefore be so arranged that they are largely or substantially completely discharged at this later portion of the reception periods.

To insure the condition of substantially complete discharge of the negative bias discharge circuits to restore full gain of the amplifiers 15 to 17 toward the end of each reception period, the time constant of these circuits should be only of the order of one-tenth of the time period of the sweep trace cycle, as shown approximately in curve 47 of Fig. 2. For example, assuming a transmitter pulse repetition rate of 1000 per second in which case the time constant may be assumed to be $100 \times 10^{-6}$ second, the following table shows various combinations of values of C and R which may be employed to obtain the same time constant and the desired bias voltage variation.

| C | R |
|---|---|
| *Microfarads* | |
| 100 | 1 megohm |
| 1000 | 100,000 ohms |
| .01 | 10,000 ohms |

Thus by proper choice of the circuit constants and by the employment of amplifiers having the proper characteristics, a desired increase in gain during the reception period or sweep trace cycle may be secured, the receiver sensitivity rising to or near its maximum value toward the later part of the cycle, during which later part the reflected pulses from the more distant objects are received, requiring the full gain of the receiver for adequate definition. By a suitable choice of time constants in the bias discharge circuits 30 to 32 in one or more stages it is possible to obtain an approximation to a square law change in sensitivity of the receiver. Further, an approximation of a fourth power rate of sensitivity change may be obtained by employing more controlled stages such as 15 to 17 in Fig. 1.

In the foregoing description of the manner in which the gain is increased during each reception period, the transmitter pulse is described as utilized in obtaining the desired varying bias potential on the control electrodes of the amplifiers 15 to 17. It will be seen that in case the receiver is arranged to be in a deenergized condition during the transmission period of the pulse from transmitter 10, it is possible, instead of utilizing the transmitter pulse, to supply the desired biasing potentials to the intermediate frequency amplifier stages from other usual wave shaping circuits. However, the utilizing of the direct pulse from transmitter 10 is preferred because of its simplicity.

It is well known that the input capacity of certain types of electron discharge devices, such as those characterized by high Gm or mutual conductance, varies with the control electrode bias, the input capacity decreasing at low anode current. Therefore, by the use of amplifiers of suitable type, such as the high Gm type above mentioned for example, this decrease in the tuning input capacity of amplifiers 15, 16 and 17 may be utilized to produce detuning of the stages and consequent increase in band width during each reception period or sweep trace cycle, the negative bias being high at the beginning of the reception periods and the anode current being correspondingly low. Thus the band width of the intermediate frequency amplifier stages is caused to vary inversely with the gain of these stages. The wide band width in the receiver output is desirable to insure accuracy in the determination of distances and for the separation of individual echoes over short distances, up to approximately 15 miles in range finding. Long distance detection on the other hand, over distances ranging up to 150 miles for example, requires the maximum usable sensitivity of the receiver which usually implies decreased band width. Since the use of the system for detection involves also a certain amount of range finding and vice versa, it is usually desirable that detection and range finding be accomplished in a single receiver with optimum performance for either condition.

Referring to Fig. 3 in connection with Fig. 1, simultaneous variation of band width with gain in the system of Fig. 1 is also obtained, and the total band width variation increased, by utilizing symmetrical detuning in the intermediate frequency amplifier stages. Employing intermediate frequency amplifiers of the 1852-6AC7 type and assuming that the unbypassed resistance 24 of the first stage 15 has a value which is very small or that the cathode 21 is at ground, the input capacity of the first amplifier is decreased by at least one micromicrofarad at low anode current as shown in Fig. 3. Detuning of the first amplifier is then produced as indicated by curve 48 of Fig. 3. Assuming that the unbypassed resistance 25 of the second stage 16 has a value of 60 ohms, its input capacity is changed by about the same amount in the opposite direction, as shown by the curve 49 of Fig. 3, so that symmetrical detuning is thus produced in conjunction with the change in input capacity of the first stage 15. In the third stage 17 the value of the cathode resistance 26 may be 30 ohms, this stage maintaining constant tuning in itself as shown by curve 50. The overall tuning of the receiver as shown by curve 51 is then broadened at low anode current corresponding to the earlier portion of the reception period and sweep trace cycle. The broadening effect can be increased by using a higher IF frequency or vice versa. That is, a ten per cent change in C will represent more megacycles at a higher IF frequency.

Referring to Fig. 4, capacity curves are shown therein for the 1853-6AB7 type amplifier instead of the 1852-6AC7 in the intermediate frequency amplifier stages 15 to 17, the unbypassed resistance for the stages having respectively the values 0 ohms, 90 ohms, and 60 ohms. As shown by the capacity curves of Fig. 4, somewhat less change in input capacity and therefore less gain variation is produced by use of the 1853-6AB7 than by the 1852-6AC7 amplifier.

In the symmetrical detuning arrangements illustrated in Figs. 3 and 4 the amount of detuning which may be obtained in a given stage is dependent upon the circuit "Q" and upon the ratio of the change $\Delta C_g$, in input capacity to the total circuit capacity. A capacity change of one micromicrofarad may occur in a total capacity of approximately 15 micromicrofarads, producing at least a three per cent frequency change. For example, if the intermediate frequency stages are tuned to 40 megacycles, a detuning of 1.2 megacycle may be obtained on either side of resonance which, together with the band width broadening caused in connection with the variation in gain by use of the bias circuits 30 to 32, produces adequate results in total broadening of the band width. In utilizing symmetrical detuning for varying of the band width the bias discharge circuits 30 to 32 should have approximately the same time constant. It is desirable that in the tuning of the amplifier stages 15 to 17, all of the stages be peaked at the same frequency for the condition of maximum sensitivity, as indicated by curves 52, 53 and 54 of Fig. 3.

Referring to Figs. 5 and 6, in Fig. 5 a sweep trace is shown having indications of reflected pulses or echoes produced by a conventional detection and range finding system having constant gain and band width during the reception period. Indications of reflected pulses corresponding to nearby objects appear as one large block 55 in the sweep trace of the receiver and cannot be distinguished individually. Further, the indications such as 56 of individual echoes in the later portion of the sweep trace are difficult to distinguish from other pulse indications and from the noise indications which are large relatively to the echo indications because no reduction in band width during this later portion of the cycle is provided.

In Fig. 6, however, wherein is shown a sweep trace having indications of the same reflected pulses as in Fig. 5 but produced in accordance with the present invention, the indications 57, 58, 59 of several individual reflected pulses from nearby objects are observable and in the later portion of the trace, an indication, such as 56, of the reflected pulse from a distant object stands out prominently from other pulses and from the noise level indications because of the increase in gain and simultaneous decrease in band width in this later portion as illustrated generally by the gain curve 60 and the band width curve 61.

The invention has been illustrated and described herein as applied particularly to a detecting and range finding system in which the apparatus comprises, at a given location, not only a receiving means but also a transmitter which projects directly to the objects the main pulses which after reflection from the objects are later picked up and indicated by the receiving means. It will be understood, however, that the invention is not limited to such system combining a transmitter and receiver in one location, but that the invention may be applied to any pulsed receiver, the tuning of the receiver being changed, in accordance with the present invention, in a predetermined manner during the pulse period.

My invention has been described herein in particular embodiments for purposes of illustration. It will be understood, however, that the invention is susceptible of various changes and modifications and that by the appended claims I intend to cover any such modifications as fall within the true spirit and scope of my invention.

What I claim as new and desire to secure by Letters Patent of the United States is:

1. In combination, means for projecting pulses to objects at varying distances, a receiver for providing indications of said pulses after reflection from said objects, said receiver including a plurality of amplifier stages each having a cathode and a control electrode, the control electrodes of said amplifiers each having a bias discharge circuit connected thereto, means to charge said bias circuits by said projected pulses at each reception period of said reflected pulses, and a plurality of unbypassed resistances of predetermined differing values connected respectively in series with said cathodes for detuning symmetrically said amplifier stages, whereby the gain of said receiver is increased and simultaneously the band width thereof is decreased during each of said reception periods.

2. In combination, means to project a succession of high frequency pulses spaced apart in time toward objects spaced at different distances, a receiver for receiving pulses from said objects during the intervals between the pulses of said succession, said receiver having a predetermined transmission frequency band width, and means to decrease said band width during each of said intervals whereby said receiver has transmission band width greater for pulses from lesser distances than from greater distances.

3. In an echo apparatus in which a succession of pulses is projected toward objects spaced at different distances and resulting pulses are received from said objects during intervals between the pulses of said succession, the method of controlling the transmission band width of the receiver in which said pulses are received which comprises rectifying each projected pulse to produce a voltage reducing in value during the intervals between projected pulses, and varying said band width in accord with said potential.

4. In combination, means to radiate a succession of pulses spaced apart in time toward distant objects, means to receive pulses from said objects during the intervals between said projected pulses, said received pulses resulting from impingement of said projected pulses on said objects, said receiver including an electron discharge pulse amplifier having a plurality of stages in cascade, said stages having maximum transmission at a desired frequency, said transmission reducing at frequencies departing from said desired frequency, and means to vary during said intervals the frequencies at which said different stages have maximum transmission to reduce the transmission band width of said amplifier with time during said intervals.

5. In combination, means to radiate a succession of pulses spaced apart in time toward distant objects, means to receive pulses from said objects during the intervals between said projected pulses, said received pulses resulting from impingement of said projected pulses on said objects, said receiver including an electron discharge pulse amplifier having a plurality of stages in cascade, different of said stages having maximum transmission at different frequencies, and means to vary said different frequencies toward each other during each of said intervals thereby to narrow the transmission band width of said amplifier during the course of each of said intervals.

6. In combination, means to radiate a succession of pulses spaced apart in time toward distant objects, means to receive pulses from said objects during the intervals between said projected pulses, said received pulses resulting from impingement of said projected pulses on said objects, said receiver including an electron discharge pulse amplifier having a plurality of stages in cascade, each of said stages having a control electrode and cathode between which the received pulses are impressed and between which exist capacity, each stage having gain and frequency of maximum transmission both dependent on the potential on said capacity, means utilizing said electrodes to rectify each projected pulse to produce a charge on said capacity to reduce the gain of the respective stage and to vary said frequency of maximum transmission of the respective stage, resistance across each of said capacities of value such that said charge leaks off gradually between projected pulses to increase said gain and to vary said frequencies, said stages being so constructed and arranged that said frequencies of maximum transmission are different in different stages in the presence of said charge and vary toward each other as said charge diminishes, whereby the gain of said amplifier increases and its transmission band width diminishes during the course of each of said intervals.

7. In combination, means to radiate a succession of pulses spaced apart in time toward distant objects, means to receive pulses from said objects during the intervals between said projected pulses, said received pulses resulting from impingement of said projected pulses on said objects, said receiver including an electron discharge amplifier having a control electrode and cathode and having maximum transmission at a frequency dependent on the capacity between said control electrode and cathode, and means to vary said capacity during each of said intervals to vary the transmission band width of said amplifier.

8. The combination, in a receiver for rapidly recurring pulse trains, each train comprising pulses of reducing intensity during the respective train, of means responsive to the stronger initial pulses of said trains to reduce the sensitivity of said receiver and to increase the reception frequency band width, and means to increase said sensitivity and reduce said band width during each pulse train at a rate such that the later weaker pulses of each train are received with maximum sensitivity and minimum reception frequency band width.

9. In combination, means to transmit regularly recurring pulses to objects at varying distances, a receiver to receive said pulses after reflection from said objects, whereby said receiver receives regularly recurring trains of pulses, the pulses received from less remote of said objects being received earlier in said trains and with greater intensity than pulses from more remote objects, and means responsive to the initial pulse of each train to reduce the sensitivity of said receiver and to increase the reception frequency band width, said means including means to increase said sensitivity and to reduce the reception frequency band width during each train sufficiently that pulses from remote objects are received with maximum sensitivity and minimum reception frequency band width.

GEORGE W. FYLER.

REFERENCES CITED

The following references are of record in the file of this patent:

UNITED STATES PATENTS

| Number | Name | Date |
| --- | --- | --- |
| 2,171,637 | Shrader | Sept. 5, 1939 |
| 2,225,524 | Percival | Dec. 17, 1940 |
| 2,167,492 | Sproule | July 25, 1939 |
| 2,009,459 | Turner | July 30, 1935 |
| 2,361,648 | Petty | Oct. 31, 1944 |
| 2,143,035 | Smith | Jan. 10, 1939 |

FOREIGN PATENTS

| Number | Country | Date |
| --- | --- | --- |
| 545,778 | Great Britain | June 12, 1942 |